United States Patent [19]

Moser

[11] Patent Number: 6,105,549
[45] Date of Patent: Aug. 22, 2000

[54] CHAIN TENSIONING APPARATUS FOR A COMBUSTION ENGINE

[75] Inventor: Uwe Moser, Esslingen, Germany

[73] Assignee: DaimlerChrysler AG, Stuttgart, Germany

[21] Appl. No.: 09/245,090

[22] Filed: Feb. 5, 1999

[30] Foreign Application Priority Data

Feb. 5, 1998 [DE] Germany .............. 198 04 462

[51] Int. Cl.$^7$ ........................................... F16H 7/12
[52] U.S. Cl. ................. 123/198 R; 123/195 R; 474/101; 474/111; 474/138
[58] Field of Search ............ 123/198 R, 195 A, 123/195 R; 474/111, 119, 123, 127, 128, 101, 151, 140, 138

[56] References Cited

U.S. PATENT DOCUMENTS

| | | | |
|---|---|---|---|
| 5,010,855 | 4/1991 | Ogami et al. .................. | 123/90.31 |
| 5,055,089 | 10/1991 | Ojima ........................... | 474/138 |
| 5,064,405 | 11/1991 | John ............................. | 474/133 |
| 5,205,792 | 4/1993 | Quintas et al. ................ | 474/135 |
| 5,244,438 | 9/1993 | Golovatai-Schmidt ......... | 474/112 |
| 5,489,243 | 2/1996 | Watanabe ...................... | 474/135 |
| 5,676,614 | 10/1997 | Inoue et al. .................... | 474/110 |
| 5,720,683 | 2/1998 | Patton ........................... | 474/109 |
| 5,989,138 | 11/1999 | Capucci ......................... | 474/109 |

FOREIGN PATENT DOCUMENTS

4428556A1 of 1996 Germany .

*Primary Examiner*—Noah P. Kamen
*Assistant Examiner*—Hai Huynh
*Attorney, Agent, or Firm*—Evenson, McKeown, Edwards & Lenahan, P.L.L.C.

[57] ABSTRACT

A chain tensioning arrangement arranged in a timing case for an internal-combustion engine which acts upon a timing chain that can be driven by the crankshaft of the internal-combustion engine. The chain tensioning arrangement provides a simple device with respect to assembly and operational reliability. The chain tensioning arrangement includes a tensioning member which can be adjusted between a mounting position, releasing chain tension and a tensioning position acting upon the chain. In the mounting position, the tensioning member is clamped by a releasable locking pin which extends beyond the floor of the timing case of the internal-combustion engine.

10 Claims, 1 Drawing Sheet

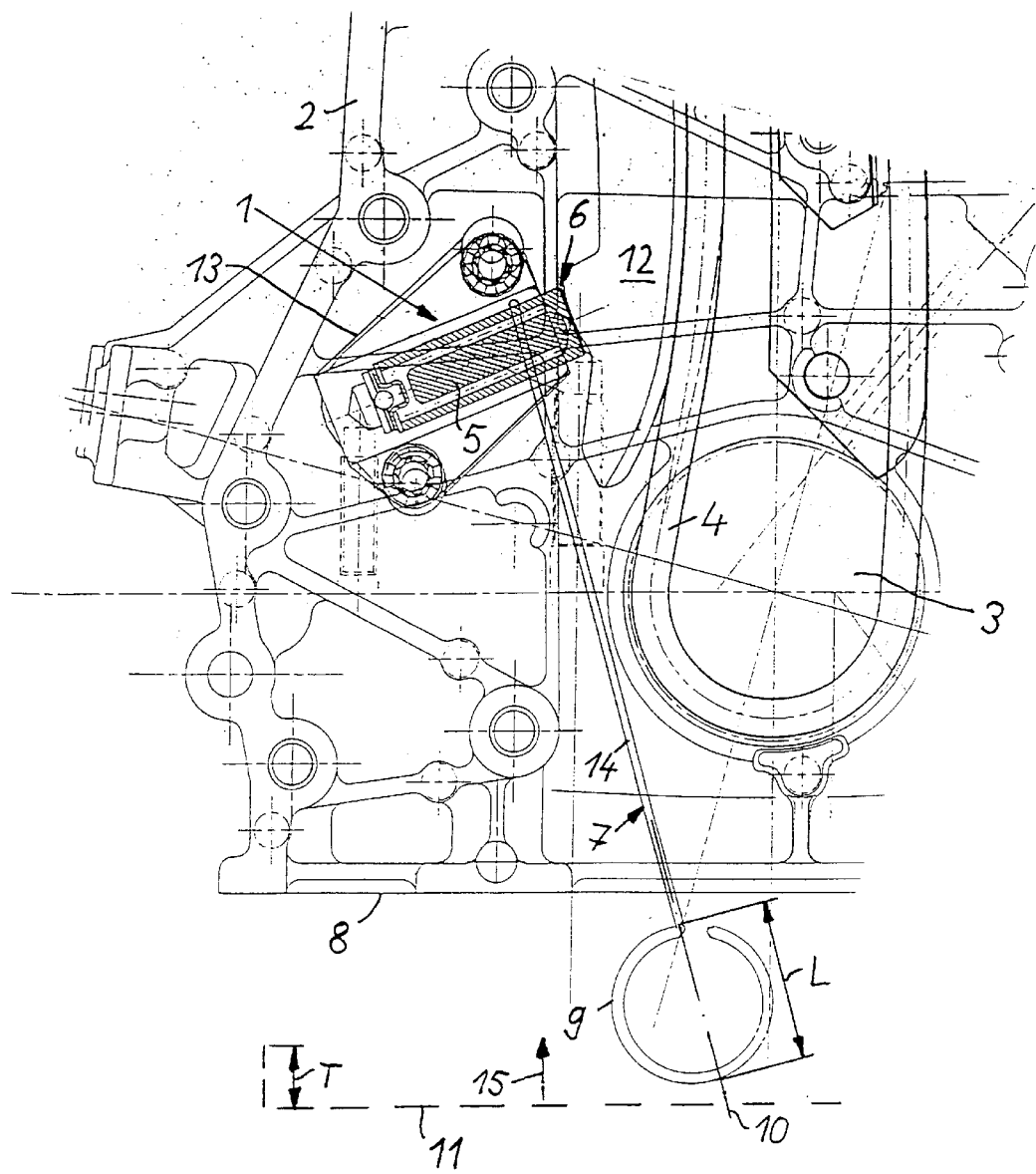

CHAIN TENSIONING APPARATUS FOR A COMBUSTION ENGINE

BACKGROUND AND SUMMARY OF THE INVENTION

This application claims the priority of 198 04 462.3-12, filed Feb. 5, 1998, the disclosure of which is expressly incorporated by reference herein.

The invention relates to a chain tensioning arrangement for an internal-combustion engine. More particularly, the present invention is directed to a chain tensioning device arranged in a timing case and acting on a timing chain that is driven by a crankshaft in an internal combustion engine.

A chain tensioning arrangement is shown in German Patent Document DE 40 17 601 C2. This chain tensioning arrangement exercises a tensioning force onto a timing chain. The camshaft of the internal-combustion engine is drivably connected with the crankshaft by the timing chain. The chain tensioning arrangement, which is to be operated hydraulically, acts upon a movable chain guide. The chain guide is in sliding contact with the timing chain so that the tensioning force generated by the chain tensioning arrangement is transmitted by way of the chain guide to the timing chain. The chain tensioning arrangement is fastened to a timing case in which the timing chain is accommodated. When the chain is worn, the chain tensioning arrangement provides a defined tensioning of the timing chain.

Because of the control elements and supply lines of the chain tensioner, this arrangement has a complicated construction and is therefore correspondingly susceptible to disturbances and is maintenance-intensive. Particularly for mounting and demounting, diverse connections must be connected with one another. In addition, an oil pump is required for providing the hydraulic pressure.

A different, purely mechanically operating chain tensioner is shown in German Patent Document DE 39 41 903 C2. The chain tensioner contains a tensioning member which is movably disposed in a housing and is acted upon by a spring in the direction of the timing chain. For mounting of the chain tensioner, the tensioning member can be locked by means of a locking pin. The locking pin extends through the chain tensioner housing so that the tensioning member does not act upon the timing chain and an easy mounting is possible. After the chain tensioner is inserted into the case of the internal-combustion engine, the locking pin is removed and the chain tensioner takes up its tensioning position acting upon the timing chain.

In the case of this chain tensioner, there is the risk that after mounting, the locking pin accidentally may not be removed so that the tensioning member remains in its mounted position and the timing chain is not tensioned. If this omission is not noticed, the untensioned timing chain may damage the engine by beating and skipping. If the omission is not noticed until after the conclusion of the assembly of the internal-combustion engine, the timing case must be removed at considerable additional expenditures and the locking pin must be released, which results in additional costs.

The present invention is directed to overcoming these problems by providing a chain tensioning arrangement comprising a simple device with respect to its mounting and operational reliability.

According to the present invention, the problems of the prior devices are solved by means of a chain tensioning device being mounted in a timing case in an internal combustion engine. The tensioning device comprises a tensioning member which is clamped by a releasable locking pin which extends below the floor of the timing case.

The length of the locking pin is dimensioned such that a section of the pin protrudes out of the timing case. As such, during final assembly while the locking pin is inserted, i.e., when a tensioning member is locked in the mounted position, it is impossible to leave the locking pin in place because the oil pan, which covers the timing case, cannot be mounted. The free end of the locking pin projects downward beyond the floor of the timing case. The oil pan cannot be mounted before the locking pin is removed and the tensioning member can take up its tensioning position. As such, the locking pin cannot be mistakenly left in the timing case.

The downward-projecting locking pin also has the advantage that, in the area of the timing case, no additional components are required for mounting the chain tensioning arrangement. Such additional components, in addition to increasing the variety of parts, can result in a weakening of the housing and in problems with the tightness. In particular, it is not necessary to provide a lid in the timing case receiving the chain tensioner in order to be able to withdraw the pin after the installation of the chain tensioner though the opened lid.

In an expedient embodiment, the locking pin has an operating grip which, in the mounted position, is situated outside the floor of the timing case. This facilitates the gripping and operating of the pin and excludes a mounting of the oil pain in the event that the locking pin is accidentally still inserted. The size of the operating grip increases its visibility, so that the fitter's attention is drawn to the locking pin still situated in the timing case.

Viewed in the axial direction of the locking pin, the operating grip is preferably longer than the depth, measured in the same direction of the oil pain. This ensures that the oil pan can definitely not be mounted while the pin is inserted. The locking pin may be manufactured of a wire-formed part which is easy to process and from which, particularly at low expenditures, an operating grip can be formed which is constructed in one piece with the pin body.

Other objects, advantages and novel features of the present invention will become apparent from the following detailed description of the invention when considered in conjunction with the accompanying drawings.

BRIEF DESCRIPTION OF THE DRAWINGS

Additional advantages and expedient embodiments are found in the additional claims, in the description of the figure and in the drawing, wherein FIG. 1 is a cross sectional view of an embodiment of the present invention showing an engaged locking pin.

DETAILED DESCRIPTION OF THE DRAWINGS

FIG. 1 illustrates a timing case 2 in the lateral area of the crankcase of an internal-combustion engine. A chain tensioning arrangement 1 consisting of a tensioning member 5, which is acted upon by a force, is arranged in a housing 13 which is screwed to the timing case 2. In the area of the face of the crankshaft 3, a timing chain 4 or a timing belt is positioned by which an overhead camshaft is driven.

In order to maintain a constant chain tension, particularly when the timing chain 4 is worn, the tensioning member 5 of the chain tensioning arrangement 1 presses against a movable chain guide 12. Chain guide 12 is arranged on the exterior side of the chain above the crankshaft 3 and is displaceably arranged transversely to the longitudinal direction of the chain. In the illustrated tensioning position 6, the tensioning member 5 presses at a constant defined tensioning force against the chain guide 12. Under the effect of the tensioning force, chain guide 12 is pushed against the timing chain and tensions it.

For mounting and demounting purposes, the tensioning member 5 of the chain tensioning arrangement 1 is locked in a mounted position in which the tensioning member 5 is set back from the chain guide 12 and is accommodated in the housing 13 of the tensioning arrangement 1. The chain guide 12 is therefore free of tension forces. In addition, the tensioning member 5 presents no obstacle projecting out of the housing 13 during the mounting and demounting.

The locking of the tensioning member 5 in the housing 13 takes place by means of a locking pin 7. Locking pin 7 has a pin body 14 and an operating grip 9. The locking pin 7 may be constructed as a one-piece wire-formed part. In the mounted position, the pin body 14 of the locking pin 7 has a free end extending through a recess in the housing 13 of the chain tensioning arrangement 1 and into a locking groove or similar device in the tensioning member 5. In this position tensioning member 5 acted upon by force remains in its mounted position and the chain guide 12 is subjected to no tensioning force.

The locking pin 7 extends downwardly through the timing case 2 and projects beyond the floor 8 of the timing case 2. The operating grip 9 formed on the pin body 14 is situated completely on the outside of the timing case 2. The operating grip 9 has a circular construction and a diameter L which is larger than the depth T of an oil pan 11 fastened to the floor 8 of the timing case 2. In each case, the locking pin 7 projects in its inserted condition so far beyond the floor 8 that the oil pan 11 cannot be mounted while locking pin 7 is inserted. Optionally, in addition to the operating grip 9, a section of the pin body 14 also project beyond the timing case 2.

In the illustrated embodiment, the locking pin 7 is situated diagonally in the timing case 2 so that the longitudinal axis 10 of the locking pin together with the floor 8 of the timing case encloses an angle deviating from 90°. In the projection of the mounting direction 15 of the oil pan 11, the portion of the locking pin projecting beyond the floor 8 must project over the depth T of the oil pain 11.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A chain tensioning arrangement for an internal-combustion engine, the chain tensioning arrangement being arranged in a timing case and acting upon a timing chain which can be driven by the crankshaft of the internal-combustion engine, the chain tensioning arrangement comprises a tensioning member adjustable between a mounted position releasing tension on the timing chain and a tensioning position producing tension on the timing chain, and a releasable locking pin for clamping the tensioning member in the mounted position, the releasable locking pin extends beyond a floor of the timing case of the internal-combustion engine.

2. A chain tensioning arrangement according to claim 1, wherein the locking pin has an operating grip which, in a mounted position of the locking pin, is situated outside the floor of the timing case.

3. A chain tensioning arrangement according to claim 2, wherein the operating grip has a length measured in the direction of a longitudinal axis of the locking pin that is larger than a depth of an oil pan to be fastened on the floor of the timing case.

4. A chain tensioning arrangement according to claim 3, wherein the locking pin is a wire-formed part.

5. A chain tensioning arrangement according to claim 2, wherein the locking pin is a wire-formed part.

6. A chain tensioning arrangement according to claim 1, wherein the locking pin is a wire-formed part.

7. An apparatus for mounting a timing chain tensioning device in a timing case for an internal combustion engine comprising:

a chain tensioning member having a locking groove, the chain tensioning member being adjustably mounted to the timing case to selectively apply pressure to a timing chain; and a locking member for maintaining the chain tensioning member in a preselected position, the locking member further comprising a body having a locking end releaseably engageable with the locking groove and a gripping end extending through the timing case such that when the locking member is engaged with the locking groove, the engine cannot be started.

8. An apparatus for mounting a timing chain tensioning device according to claim 7, wherein the gripping end comprises an operating grip having a length measured in the direction of a longitudinal axis of the locking member that is larger than a depth of an oil pan to be fastened on a floor of the timing case.

9. An apparatus for mounting a timing chain tensioning device according to claim 8, wherein the locking member is a wire-formed part.

10. An apparatus for mounting a timing chain tensioning device according to claim 7, wherein the locking member is a wire-formed part.

* * * * *